United States Patent [19]

Song

[11] Patent Number: 5,293,241
[45] Date of Patent: Mar. 8, 1994

[54] METHOD AND CIRCUIT FOR CONTROLLING OPENING/CLOSING OF A CAMCORDER IRIS DIAPHRAGM

[75] Inventor: Jung S. Song, Seoul, Rep. of Korea

[73] Assignee: Gold Star Co., Ltd., Seoul, Rep. of Korea

[21] Appl. No.: 857,498

[22] Filed: Mar. 25, 1992

[30] Foreign Application Priority Data

Apr. 2, 1991 [KR] Rep. of Korea ............. 5304/1991
Jun. 24, 1991 [KR] Rep. of Korea ............. 9409/1991

[51] Int. Cl.$^5$ .................................. H04N 5/238
[52] U.S. Cl. ............................ 348/365; 354/446
[58] Field of Search ............ 358/228, 909, 209, 211, 358/161, 162; 354/446, 451, 410; H04N 5/235, 5/238

[56] References Cited

U.S. PATENT DOCUMENTS

4,554,587 11/1985 Ooi et al. ................... 358/228

FOREIGN PATENT DOCUMENTS

3-108882 5/1991 Japan .................. H04N 5/235

Primary Examiner—Joseph Mancuso
Assistant Examiner—Wendy R. Greening
Attorney, Agent, or Firm—Spencer, Frank & Schneider

[57] ABSTRACT

A circuit for controlling the opening and closing of a camcorder iris diaphragm including a luminance signal detector for detecting a luminance signal from an image signal of an object received therein, a buffer for buffering the luminance signal from the luminance signal detector, a signal converter for converting the luminance signal from the buffer into a DC signal having a mean value level of the luminance signal, a differential amplifier for amplifying a level difference between the DC signal from the signal converter and a predetermined reference signal, a motor driver for receiving an output signal from the differential amplifier, as a negative (−) drive voltage signal, and a predetermined motor voltage signal, as a positive (+) drive voltage signal, and applying a level difference therebetween as a motor drive voltage signal to an iris motor, and a clipper connected for blocking the DC signal from the signal converter to the differential amplifier when its level is above a predetermined level and passing it from the signal converter to the differential amplifier when its level is below the predetermined level. Therefore, by preventing an oscillating operation of the iris diaphragm, the camcorder can take a picture of an object such as a light source of high brightness, without a separate mechanism such as a neutral density (ND) filter.

18 Claims, 3 Drawing Sheets

METHOD AND CIRCUIT FOR CONTROLLING OPENING/CLOSING OF A CAMCORDER IRIS DIAPHRAGM

BACKGROUND OF THE INVENTION

1. Field of the Invention

The present invention relates in general to opening and closing of a camcorder iris diaphragm, and more particularly to a method and circuit for controlling the opening and closing of the camcorder iris diaphragm in accordance with a magnitude of a luminance signal received therein.

2. Description of the Prior Art

Typically, an iris diaphragm is mounted in a camera for taking a picture of an object, such as a still camera, a movie camera, a camcorder (camera and recorder) and the like. In taking a picture of an object, it is necessary to control the opening and closing of the camcorder iris diaphragm in accordance with a magnitude of a luminance signal received therein. In other words, the larger the magnitude of the luminance signal becomes, the smaller the opening level of the iris diaphragm must be; alternatively, the smaller the magnitude of the luminance signal becomes, the larger the opening level of the iris diaphragm must be.

Referring to FIG. 1, there is shown a block diagram of a circuit for controlling opening and closing of a camcorder iris diaphragm in accordance with the prior art. The illustrated circuit comprises a luminance signal detector 1 for detecting a luminance signal Y from an image signal of an object received therein, a buffer 2 for buffering the luminance signal Y output from the luminance signal detector 1, a signal converter 3 for converting the luminance signal Y output from the buffer 2 into a direct current (DC) signal of the mean level value of the luminance signal Y, a differential amplifier 4 for amplifying a level difference between the DC signal from the signal converter 3 and a reference DC signal of a predetermined level, an iris motor 6, and a motor driver 5 for driving the iris motor 6 in accordance with a level difference between an output signal from the differential amplifier 4 and another reference DC signal.

The differential amplifier 4 includes a variable resistor VR1 for varying a predetermined DC voltage Vcc, an operational amplifier OP1 having its inverting input terminal (−) for inputting the reference DC signal, or an output signal from the variable resistor VR1 and its non-inverting input terminal (+) for inputting the converted DC luminance signal, that is, the output signal from the signal converter 3, and parallel connected capacitor C1 and resistor R1 connected between an output terminal of the operational amplifier OP1 and the inverting input terminal (−) thereof.

The operation of the conventional circuit with the above-mentioned construction will now be described.

First, the luminance signal detector 1 detects the luminance signal Y from the image signal which includes the luminance signal Y and a chrominance signal C. Then, the detected luminance signal Y from the detector 1 is buffered by the buffer 2 which then applies the buffered luminance signal Y to the signal converter 3. Upon receiving the luminance signal Y from the buffer 2, the signal converter 3 converts the received luminance signal Y into a DC signal of the mean level value of the luminance signal Y and applies the DC signal to the non-inverting input terminal (+) of the operational amplifier OP1 included in the differential amplifier 4, the inverting input terminal (−) of which is applied with a reference DC signal of a predetermined level given by the variable resistor VR1. As a result, the operational amplifier OP1 in the differential amplifier 4 operates to amplify a level difference between the DC signal at its non-inverting input terminal (+) and the reference DC signal at its inverting input terminal (−). Then, the output signal from the operational amplifier OP1 is applied as a negative (−) drive signal to the motor driver 5. Motor driver 5 is also connected to another reference DC signal, predetermined positive (+) drive signal $+V_{CM}$. In accordance with a level difference between the negative (−) drive signal and the positive (+) drive signal $+V_{CM}$, the motor driver 5 drives the iris motor 6, thereby allowing the iris diaphragm (not shown) to be opened and closed according to the rotational direction and speed of the iris motor 6.

Namely, the level of the DC signal from the signal converter 3 is increased as the luminance signal Y component of the image signal is increased based on circumstances of a picture of an object being taken. Because of an increase in the level of the input signal to the non-inverting input terminal (+), subsequently, the operational amplifier OP1 in the differential amplifier 4 outputs the level difference increased signal. Since such level difference increased signal from the operational amplifier OP1 is applied as the negative (−) drive signal to the motor driver 5, the level difference between the negative (−) drive signal and the positive (+) drive signal $+V_{CM}$ becomes relatively smaller. For this reason, the motor driver 5 operates to drive the iris motor 6 in a direction to close the iris diaphragm.

On the other hand, as the luminance signal Y component of the image signal is decreased based on circumstances of a picture of an object being taken, the level of the DC signal from the signal converter 3 is decreased and, therefore, the operational amplifier OP1 in the differential amplifier 4 outputs a decreased level difference signal corresponding to a decrease in the level of the input signal to the non-inverting input terminal (+). Since such level difference decreased signal from the operational amplifier OP1 is applied as the negative (−) drive signal to the motor driver 5, the level difference between the negative (−) drive signal and the positive (+) drive signal $+V_{CM}$ becomes relatively larger. Consequently, the motor driver 5 operates to drive the iris motor 6 in a direction opening the iris diaphragm.

However, the above-mentioned conventional circuit has the following disadvantage. That is, in a case where an object to be taken is a light source of high brightness, such as a solar light, the luminance signal Y component is thus increased, resulting in an increase in the level of the DC signal from the signal converter 3. Hence, the operational amplifier OP1 in the differential amplifier 4 outputs a corresponding increase level difference signal, thereby causing the level difference between the negative (−) drive signal and the positive (+) drive signal $+V_{CM}$ to become relatively smaller. As a result, the motor driver 5 operates to drive the iris motor 6 in a direction closing the iris diaphragm. Ultimately, the iris diaphragm is fully closed because the object being taken is the light source of high brightness, such as a solar light. Since an incoming light through a lens (not shown) is blocked by the full closing of the iris diaphragm, the luminance signal Y becomes a low signal level representative of no signal. At this time, the level of the DC signal from the signal converter 3 correspondingly falls to zero level and, therefore, the operational amplifier OP1 in the differential amplifier 4 outputs a decreased level difference signal, thereby causing the level difference between the negative (−) drive signal and the positive (+) drive signal +$V_{CM}$ to become relatively larger. As a result, the motor driver 5 operates to drive the iris motor 6 in a direction opening the iris diaphragm. In other words, in a situation where a picture of an object taken is a light source of high brightness, such as a solar light, the conventional circuit repeatedly performs temporarily closing the iris diaphragm completely secure of the high brightness, then opens the iris diaphragm because no luminance signal caused by the full closing of the iris diaphragm. As a result, the opening and closing of the iris diaphragm is oscillatingly repeated at a voltage level $V_{DC}$ (close) as shown in FIG. 2. For this reason, the camcorder with the above-mentioned conventional circuit cannot take a picture of an object such as a light source of high brightness (for example, a solar light), without a separate mechanism such as a neutral density (ND) filter.

SUMMARY OF THE INVENTION

Therefore, the present invention has been made in view of the above problem, and it is an object of the present invention to provide a method and circuit for controlling the opening and closing of a camcorder iris diaphragm, whereby the opening and closing of the camcorder iris diaphragm can be stably controlled even when the camcorder takes a picture of an object of high brightness.

In accordance with one aspect of the present invention, there is provided a circuit for controlling opening/closing of a camcorder iris diaphragm including a luminance signal detecting circuit for detecting a luminance signal from an image signal of an object received therein; a buffering circuit for buffering the luminance signal outputted from the luminance signal detecting circuit; a signal converting circuit for converting the luminance signal from the buffering circuit into a DC signal of the mean level value of the luminance signal; a differential amplifying circuit for amplifying a level difference between the DC signal from the signal converting circuit and a predetermined reference signal; a motor driving circuit for inputting an output signal from the differential amplifying circuit, as a negative (−) drive voltage signal, and a predetermined motor voltage signal, as a positive (+) drive voltage signal, and applying a level difference therebetween as a motor drive voltage signal; an iris motor for opening and closing the iris diaphragm in response to the motor drive voltage signal from the motor driving circuit; and a clipping circuit connected between output of the signal converting circuit and an input of the differential amplifying circuit, for blocking the DC signal from the signal converting circuit to the differential amplifying circuit when its level is above a predetermined level and passing it from the signal converting circuit to the differential amplifying circuit when its level is below the predetermined level.

In accordance with another aspect of the present invention, there is provided a method of controlling the opening and closing of a camcorder iris diaphragm including the steps of detecting a luminance signal from an image signal of an object received; converting the luminance signal into a DC signal; blocking the DC signal when its level is above a predetermined level and passing it when its level is below the predetermined level; obtaining a level difference between the passed DC signal and a predetermined reference signal, as a negative (−) drive voltage signal to an iris motor; and applying a level difference between the obtained negative (−) drive voltage signal and a predetermined positive (+) drive voltage signal, as a motor drive voltage signal to the iris motor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 3:
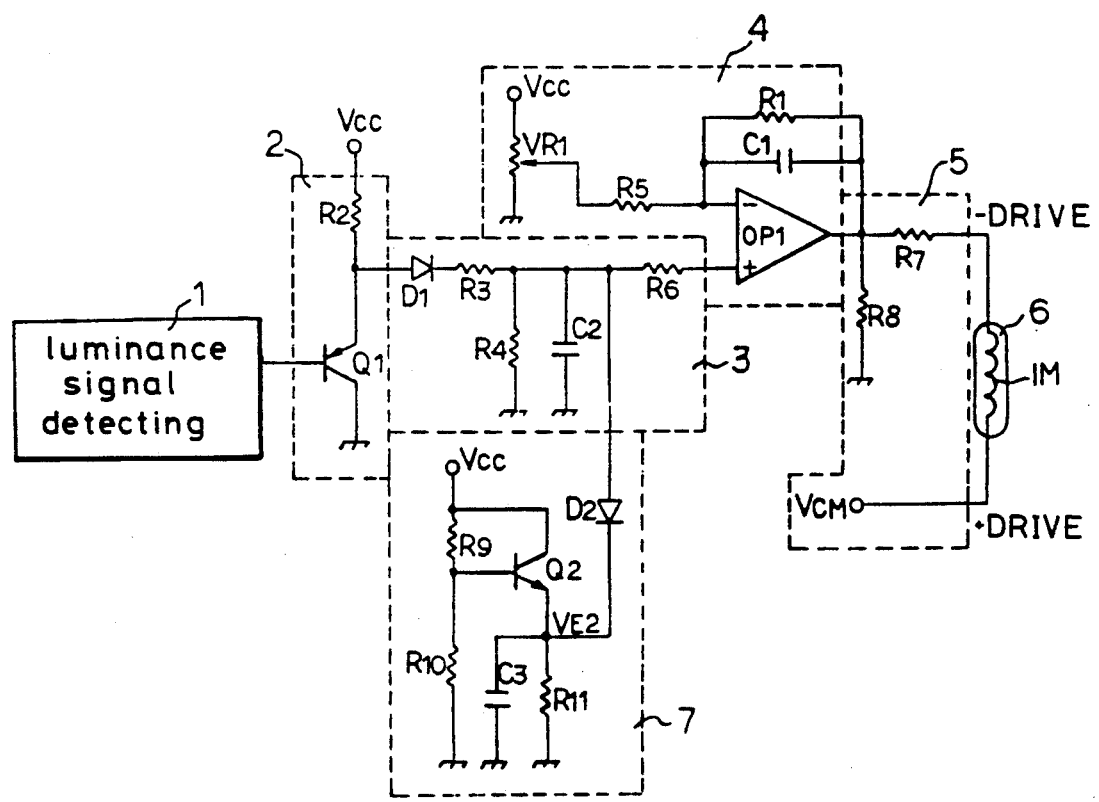
FIG. 3 is a circuit diagram of a circuit for controlling the opening and closing of a camcorder iris diaphragm in accordance with an embodiment of the present invention.

With reference to FIG. 3, there is shown a circuit diagram of a circuit for controlling the opening and closing of a camcorder iris diaphragm in accordance with an embodiment of the present invention. As shown in this drawing, the circuit comprises a luminance signal detector 1 for detecting a luminance signal Y from an image signal of a picture of an object received therein, a buffer 2 for buffering the luminance signal Y output from the luminance signal detector 1, a signal converter 3 for converting the luminance signal Y output from the buffer 2 into a direct current (DC) signal having a mean value level of the luminance signal Y, a differential amplifier 4 for amplifying a level difference between the DC signal from the signal converter 3 and a predetermined reference DC signal, an iris motor 6, a motor driver 5 for receiving an output signal from the differential amplifier 4 as a negative (−) drive voltage signal, and a predetermined motor voltage signal $V_{CN}$, as a positive (+) drive voltage signal, and applying a level difference therebetween as a motor drive voltage signal to the iris motor 6, and a clipper (or limiter) 7 for blocking the DC signal from the signal converter 3 to the differential amplifier 4 when its level is above a predetermined level and passing it from the signal converter 3 to the differential amplifier 4 when its level is below the predetermined level.

The buffer 2 is provided with a transistor Q1 for buffering the luminance signal Y from the luminance signal detector 1. The signal converter 3 includes a diode D1 for rectifying the luminance signal Y from the buffer 2 and a resistor R3 and a capacitor C2 for co-operating to function as an integrator for the rectified signal from the diode D1. Also, the differential amplifier 4 includes a variable resistor VR1 for varying a predetermined DC voltage Vcc, and an operational amplifier OP1 having an inverting input terminal (−)

for receiving the reference DC signal, the output signal from the variable resistor VR1, and a non-inverting input terminal (+) for receiving the DC signal, the output signal from the signal converter 3. A parallel connected capacitor C1 and resistor R1 is connected between an output terminal and the inverting input terminal (−) of the operational amplifier OP1. The clipper 7 is provided with a transistor Q2 which receives a bias voltage from resistors R9 R10, and a capacitor C3 and a ground resistor R11 which receive the DC signal from the signal converter 3 through a diode D2 and, also, an emitter voltage of the transistor Q2. In such a construction, the clipper 7 can block a DC signal from the signal converter 3 to the differential amplifier 4 when the DC level is above a predetermined level ($V = V_{D2} + V_{E2}$).

Now, the operation of the circuit with the above-mentioned construction in accordance with the present invention will be described in detail.

First, the luminance signal detector 1 detects a luminance signal Y from the image signal which includes both an luminance signal Y and a chrominance signal C. Then, the detected luminance signal Y from the detector 1 is buffered by the buffer 2 which then applies the buffered luminance signal Y to the signal converter 3. In the signal converter 3, the luminance signal Y from the buffer 2 is rectified by the diode D1 and the rectified signal is then integrated by resistor R3 and capacitor C2. As a result of these operations, the signal converter 3 converts the received luminance signal Y into a DC signal having a mean value level of the luminance signal Y and applies the DC signal through its resistor R6 to the non-inverting input terminal (+) of the operational amplifier OP1 included in the differential amplifier 4. The inverting input terminal (−) of operational amplifier receives a predetermined reference DC signal produced by the variable resistor VR1. As a result, the operational amplifier OP1 in the differential amplifier 4 operates to amplify a level difference between the DC signal at its non-inverting input terminal (+) and the reference DC signal at its inverting input terminal (−). Herein, a resistor R4, not described described, in the signal converter 3 is a device for discharging of the capacitor C2. Then, the output signal from the operational amplifier OP1 is bias-controlled by resistors R7 and R8 in the motor driver 5 and, then, the bias-controlled signal is applied as the negative (−) drive voltage signal to a coil IM of the iris motor 6. If the luminance signal Y component is increased, the level of the DC signal from the signal converter 3 is correspondingly increased and, thus, the level of the output signal from the differential amplifier 4 is increased, thereby causing a reduced level difference between the negative (−) drive voltage signal and the positive (+) drive voltage signal $+V_{CM}$ in the motor driver 5. As a result, the iris motor 6 is driven in a direction closing the iris diaphragm.

On the contrary, if the luminance signal Y component is decreased, the level of the DC signal from the signal converter 3 is corresponding decreased and, thus, the level of the output signal from the differential amplifier 4 is decreased, thereby causing an increase in the level difference between the negative (−) drive voltage signal and the positive (+) drive voltage signal $+V_{CM}$ in the motor driver 5. As a result, the iris motor 6 is driven in a direction opening the iris diaphragm.

On the other hand, in the clipper 7, the source voltage Vcc is divided by the resistors R9 and R10 and the divided voltage is applied as a bias voltage to the base of the transistor Q2. Values of the resistors R9 and R10, emitter resistor R11 and capacitor C3 are preselected so that the level of the voltage output from the emitter of the transistor Q2 is slightly lower than that of the DC signal ($V_{DC}$: close) corresponding to the luminance signal in the situation where the iris diaphragm is fully closed. For this reason, if the mean level of the detected luminance signal Y is above a level of the DC signal corresponding to the minimum opening state of the iris diaphragm, the diode D2 is turned on connecting the DC signal from the signal converter 3 to the level slightly above the predetermined voltage level on the emitter of the transistor Q2. In this manner, the level of the DC signal corresponding to the luminance signal, which is applied to the non-inverting input terminal (+) of the operational amplifier OP1 in the differential amplifier 4, is always preferably below the level ($V_{DC}$: close) of the DC signal corresponding to the luminance signal in the situation where the iris diaphragm is fully closed.

Figure 1:
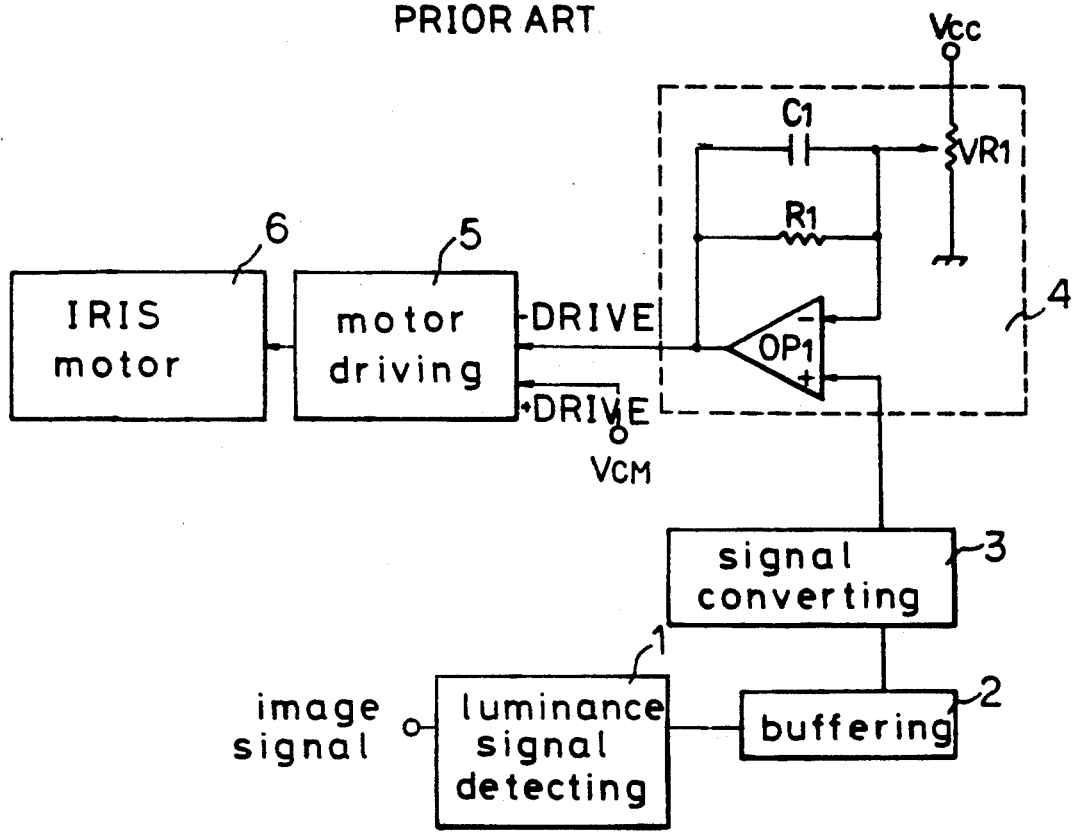
FIG. 1 is a block diagram of a circuit for controlling the opening and closing of a camcorder iris diaphragm in accordance with the prior art.
Figure 2:
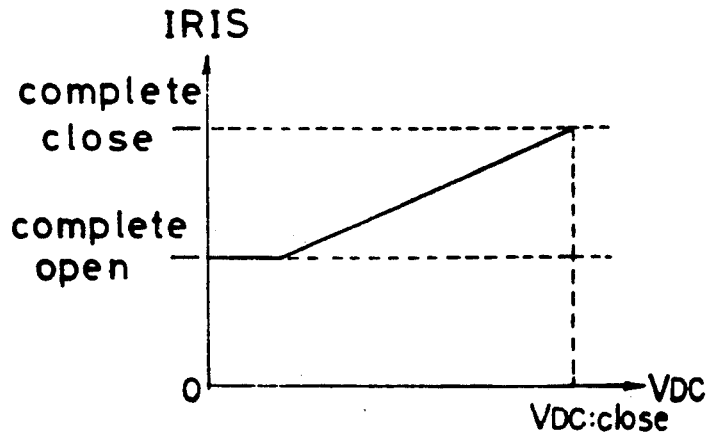
FIG. 2 is a graph illustrating a DC signal level value of a luminance signal in accordance with the prior art.
Figure 5:
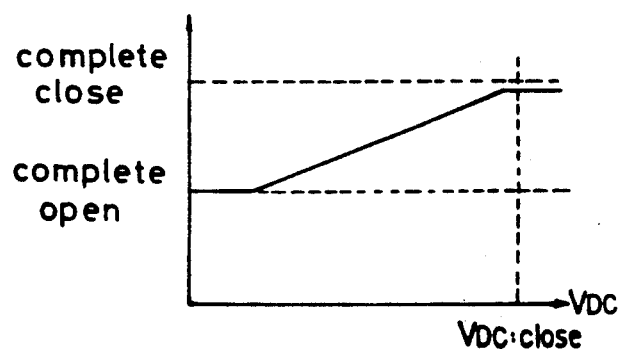
FIG. 5 is a graph illustrating a DC signal level value of a luminance signal in accordance with the present invention.

With the clipper 7, in accordance with the present invention, the level of the DC signal being applied to the differential amplifier 4 has the maximum value which is obtained by adding turn-on voltage $V_{D2CN}$ of the diode D2 to emitter voltage $V_{E2}$ of the transistor Q2, as shown in FIG. 5; however, in the conventional circuit without the clipper 7, the level of the DC signal being applied to the differential amplifier 4 is increased to the level ($V_{DC}$: close) of the DC signal corresponding to the luminance signal of the case where the iris diaphragm is fully closed, as shown in FIG. 2. The level value ($Vdc = V_{D2ON} + V_{E2}$) is preselected such that it is slightly lower than the level value ($V_{DC}$: close) of the DC signal in the situation where the iris diaphragm is fully closed. As a result, the iris diaphragm can be naturally maintained at its minimum opening state even when the output signal from the differential amplifier 4 is maximum in level. Herein, the variable resistor VR1 functions to vary the reference voltage value which is applied to the inverting input terminal (−) of the operational amplifier OP1 in the differential amplifier 4, to obtain the luminance signal of constant level.

Figure 4:
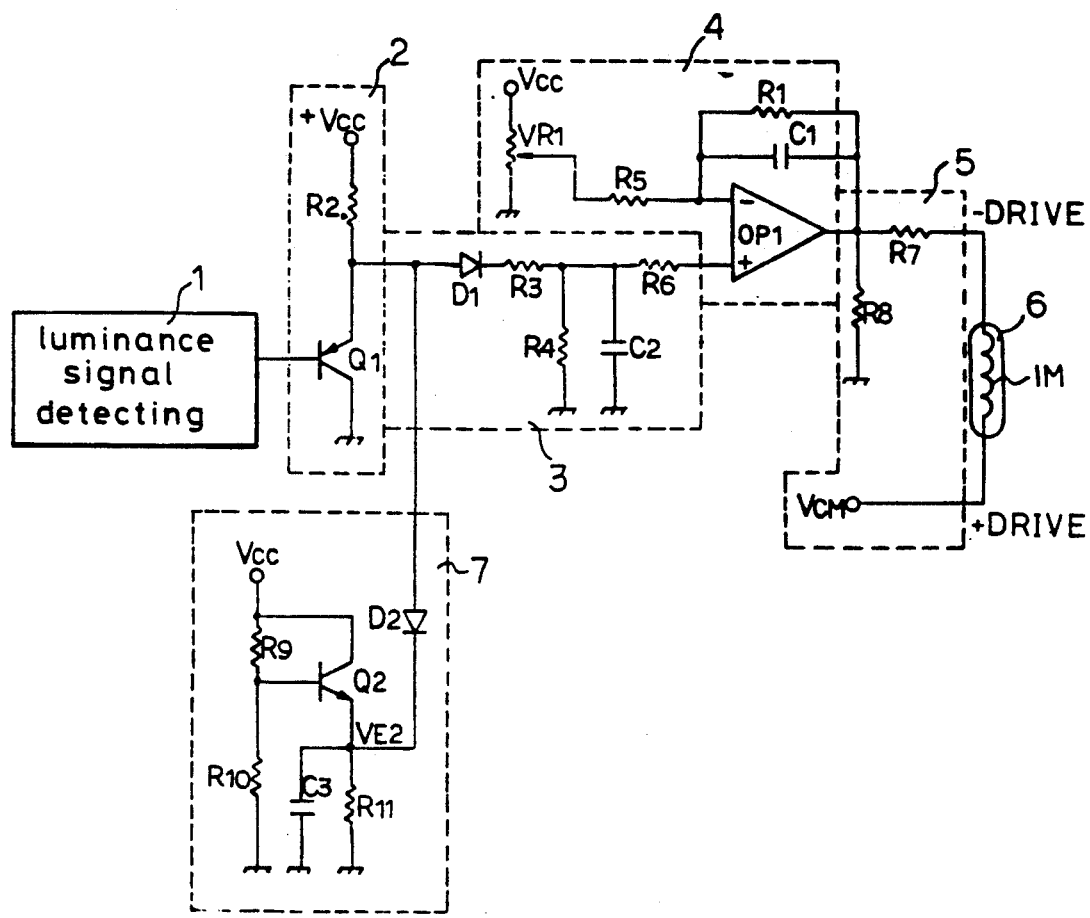
FIG. 4 is a circuit diagram of a circuit for controlling the opening and closing of a camcorder iris diaphragm in accordance with an alternative embodiment of the present invention.

With reference to FIG. 4, there is shown a circuit diagram of a circuit for controlling opening/closing of a camcorder iris diaphragm in accordance with an alternative embodiment of the present invention. The construction in FIG. 4 is the same as that in FIG. 3, except that the clipper 7 is connected between the buffer 2 and the signal converter 3. Also, the operation of the construction in FIG. 4 is substantially the same as that in FIG. 3. Hence, a description of the construction and operation in conjunction with FIG. 4 will be omitted.

As hereinbefore described, according to the present invention, there are provided method and circuit for controlling the opening and closing of a camcorder iris diaphragm, whereby the opening and closing of the camcorder iris diaphragm can be stably controlled even when the camcorder takes a picture of an object of high brightness. According to the present circuit, the iris diaphragm can be normally maintained at its minimum opening state even when an object to be taken is a light source of high brightness, such as a solar light. This is achieved by clipping the level of DC signal slightly lower than that of the DC signal corresponding to the luminance signal in the situation where the iris diaphragm is fully closed. Therefore, by preventing an oscillating operation of the iris diaphragm, the camcorder can take a picture of an object such as a light source of high brightness (for example, a solar light), without a separate mechanism such as a neutral density (ND) filter.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A circuit for controlling the opening and closing of a camcorder iris diaphragm, comprising:
   luminance signal detecting means for detecting a luminance signal from an image signal of an object received therein and outputting the luminance signal;
   buffering means for buffering the luminance signal output from said luminance signal detecting means and outputting a buffered luminance signal;
   signal converting means for converting the buffered luminance signal output from said buffering means into a DC signal having a mean value level of the buffered luminance signal;
   differential amplifying means for amplifying a level difference between the DC signal from said signal converting means and a first predetermined reference signal;
   motor driving means for receiving an output signal from said differential amplifying means, as a drive voltage signal of a first polarity, and a predetermined motor voltage signal, as a drive voltage signal of a second polarity, a difference between the drive voltage signal of the first polarity and the drive voltage signal of a second polarity being a motor drive voltage signal;
   an iris motor for opening or closing the iris diaphragm in response to the motor drive voltage signal; and
   clipping means connected between the output of said signal converting means and the input of said differential amplifying means, for blocking the DC signal output from said signal converting means to said differential amplifying means when the level of the DC signal is greater than a second predetermined reference signal and passing the DC signal output from said signal converting means to said differential amplifying means when the level of the DC signal is less than the second predetermined reference signal.

2. A circuit for controlling the opening and closing of a camcorder iris diaphragm, as set forth in claim 1, wherein the second predetermined reference signal is slightly lower than a DC signal level value of the luminance signal when the iris diaphragm is fully closed.

3. A circuit for controlling the opening and closing of a camcorder iris diaphragm, as set forth in claim 1, wherein said signal converting means includes:
   rectifying means for rectifying the buffered luminance signal output from said buffering means; and
   integrating means for integrating the rectified signal produced by said rectifying means.

4. A circuit for controlling the opening and closing of a camcorder iris diaphragm, as set forth in claim 1, wherein said differential amplifying means includes a variable resistor for varying the first predetermined reference signal.

5. A method of controlling the opening and closing of a camcorder iris diaphragm, comprising the steps of:
   detecting a luminance signal from an image signal of an object received;
   converting the luminance signal to a DC signal;
   blocking the DC signal when a level of the DC signal is greater than a first predetermined reference signal and passing the DC signal when the level of the DC signal is below the first predetermined reference signal;
   producing a drive voltage signal of a first polarity for driving an iris motor based on a level difference between the passed DC signal and a second predetermined reference signal; and
   applying the drive voltage signal of the first polarity and a predetermined drive voltage signal of a second polarity to the iris motor for driving the iris motor based on a level difference between the drive voltage signal of the first polarity and the drive voltage signal of the second polarity.

6. A method of controlling the opening and closing of a camcorder iris diaphragm, as set forth in claim 5, wherein the first predetermined reference signal is slightly less than a DC signal level value of the luminance signal when the iris diaphragm is fully closed.

7. A method of controlling the opening and closing of a camcorder iris diaphragm, as set forth in claim 5, wherein the second predetermined reference signal can be varied.

8. A circuit for controlling of a camcorder iris diaphragm, as set forth in claim 5, wherein the second predetermined reference signal is slightly less than a DC signal level value of the luminance signal when the iris diaphragm is fully closed.

9. A circuit for controlling the opening and closing of a camcorder iris diaphragm, comprising:
   luminance signal detecting means for detecting a luminance signal from an image signal of an object received therein and outputting the luminance signal;
   buffering means for buffering the luminance signal output from said luminance signal detecting means and outputting a buffered luminance signal;
   signal converting means for converting the buffered luminance signal output from said buffering means into a DC signal having a mean value level of the buffered luminance signal;
   differential amplifying means for amplifying a level difference between the DC signal from said signal converting means and a first predetermined reference signal;
   motor driving means for receiving an output signal from said differential amplifying means, as a drive voltage signal of a first polarity, and a predetermined motor voltage signal, as a drive voltage signal of a second polarity, a difference between the drive voltage signal of the first polarity and the drive voltage signal of the second polarity being a motor drive voltage signal;
   an iris motor for opening or closing the iris diaphragm in response to the motor drive voltage signal; and
   clipping means connected between the output of said buffering means and the input of said signal converting means, for blocking the buffered luminance signal output from said buffering means and input to said signal converting means when a level of the buffered luminance signal is greater than a second predetermined reference signal and passing the buffered luminance signal output from said buffering means and input to said signal converting means when the level of the buffered luminance signal is less than the second predetermined reference signal.

10. A circuit for controlling the opening and closing of a camcorder iris diaphragm, as set forth in claim 9, wherein the second predetermined reference signal is slightly lower than a DC signal level value of the luminance signal when the iris diaphragm is fully closed.

11. A circuit for controlling the opening and closing of a camcorder iris diaphragm, as set forth in claim 9, wherein said signal converting means includes:
rectifying means for rectifying the buffered luminance signal output from said buffering means; and
integrating means for integrating the rectified signal produced by said rectifying means.

12. A circuit for controlling the opening and closing of a camcorder iris diaphragm, as set forth in claim 9, wherein said differential amplifying means includes a variable resistor for varying the first predetermined reference signal.

13. A circuit for producing a diaphragm aperture control signal for opening and closing an iris diaphragm of a camera, comprising:
a luminance signal detecting circuit for detecting a luminance signal from an image signal of an object and outputting the luminance signal;
a signal converter for producing a DC signal having a level related to a magnitude of the luminance signal;
an amplifier, responsive to the DC signal, for producing a first signal related to a level difference between the DC signal and a first reference signal;
a diaphragm driver, responsive to the first signal, for producing the diaphragm aperture control signal; and
a clipping circuit coupled to the signal converter for clipping the DC signal to a second signal level when a level of the DC signal is greater than a first predetermined level and passing the DC signal when the level of the DC signal is less than the first predetermined level.

14. A circuit for producing a diaphragm aperture control signal according to claim 13, wherein the first predetermined level corresponds to a level of the DC signal level when the iris diaphragm is closed.

15. A circuit for producing a diaphragm aperture control signal according to claim 13, wherein the clipping circuit includes:
a reference voltage level circuit for generating a first reference voltage related to the first predetermined level; and
a rectifier coupled between the DC signal and the first reference voltage.

16. A circuit for producing a diaphragm aperture control signal for opening and closing an iris diaphragm of a camera, comprising:
a luminance signal detecting circuit for detecting a luminance signal from an image signal of an object and outputting the luminance signal;
a signal converter for producing a DC signal having a level related to a magnitude of the luminance signal;
an amplifier, responsive to the DC signal, for producing a first signal related to a level difference between the DC signal and a first reference signal;
a diaphragm driver, responsive to the first signal, for producing the diaphragm aperture control signal; and
a clipping circuit coupled to the signal converter for clipping the luminance signal to a second signal level when a level of the luminance signal is greater than first predetermined level and passing the luminance signal when the level of the luminance signal is less than the first predetermined level.

17. A circuit for producing a diaphragm aperture control signal according to claim 16, wherein the first predetermined level corresponds to a level of the luminance signal level when the iris diaphragm is closed.

18. A circuit for producing a diaphragm aperture control signal according to claim 16, wherein the clipping circuit includes:
a reference voltage level circuit for generating a first reference voltage related to the first predetermined level; and
a rectifier coupled between the luminance signal and the first reference voltage.

* * * * *